Aug. 19, 1930.     C. C. HOWARD     1,773,457
SHEET CUTTING MECHANISM FOR BOOK MAKING MACHINES
Filed Nov. 22, 1928     12 Sheets-Sheet 1

Inventor
C. C. Howard.
By Lacey & Lacey, Attorneys

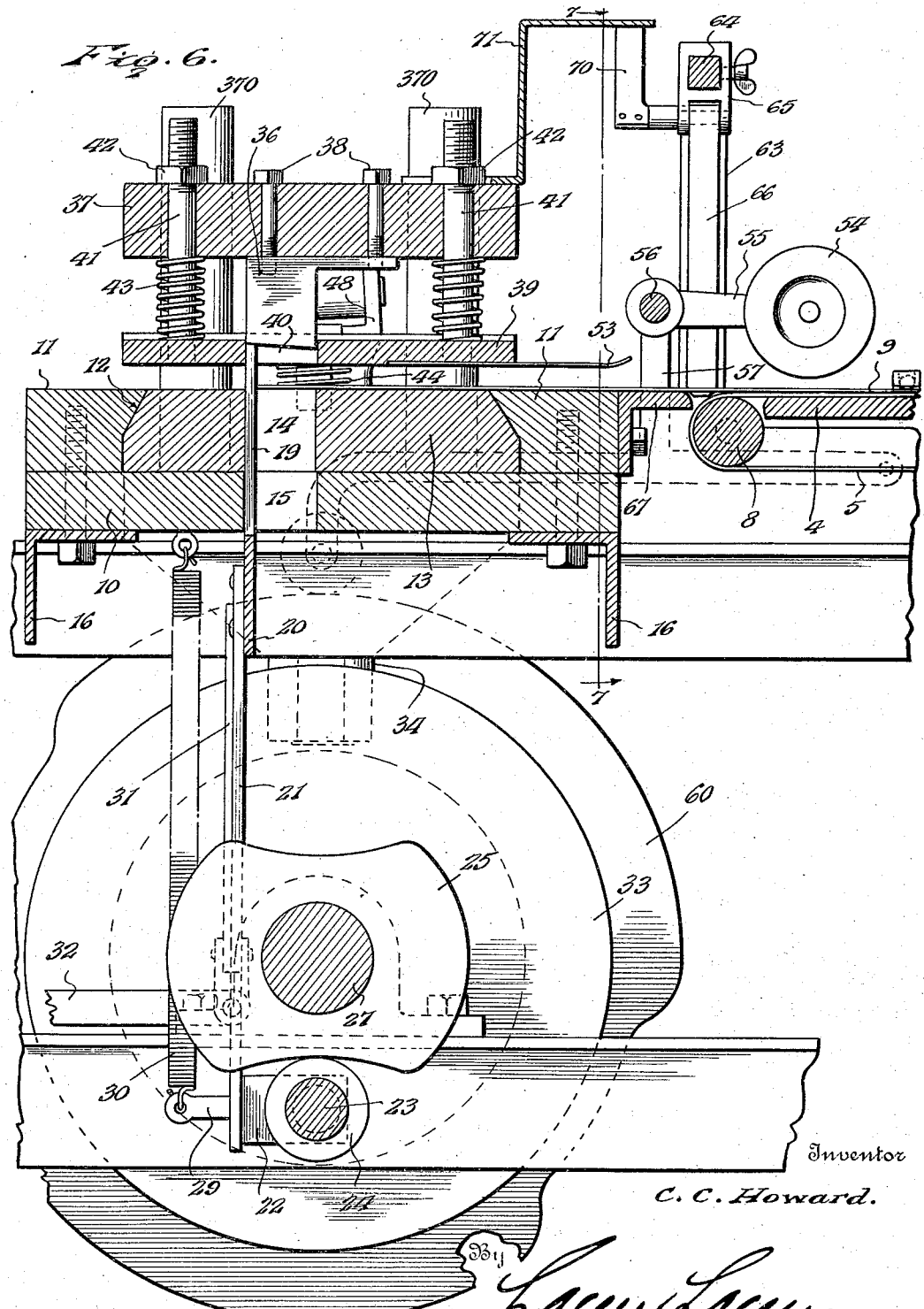

Aug. 19, 1930.   C. C. HOWARD   1,773,457
SHEET CUTTING MECHANISM FOR BOOK MAKING MACHINES
Filed Nov. 22, 1928   12 Sheets-Sheet 7
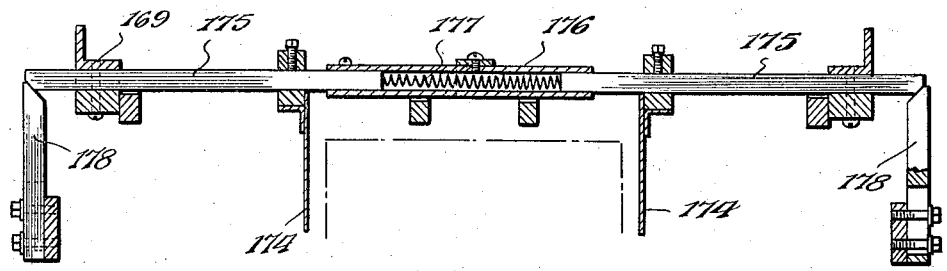
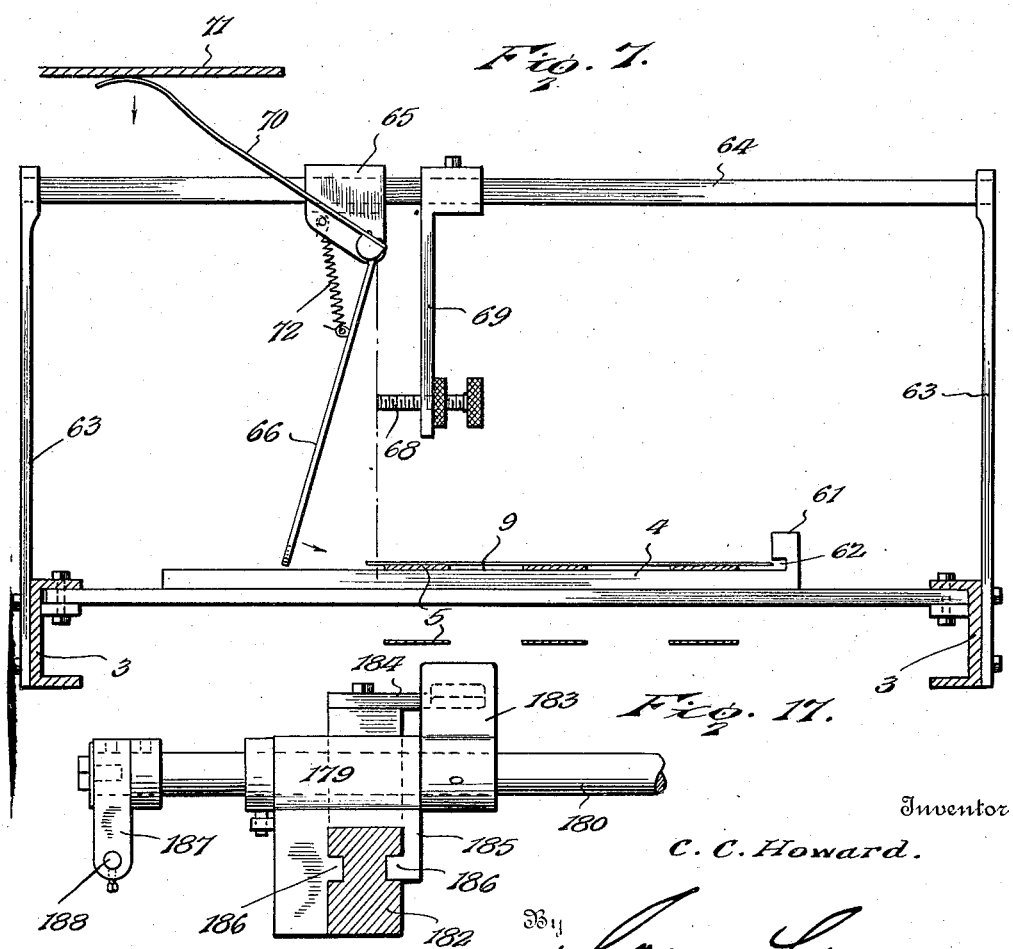
Inventor
C. C. Howard.
By Lacey & Lacey, Attorneys

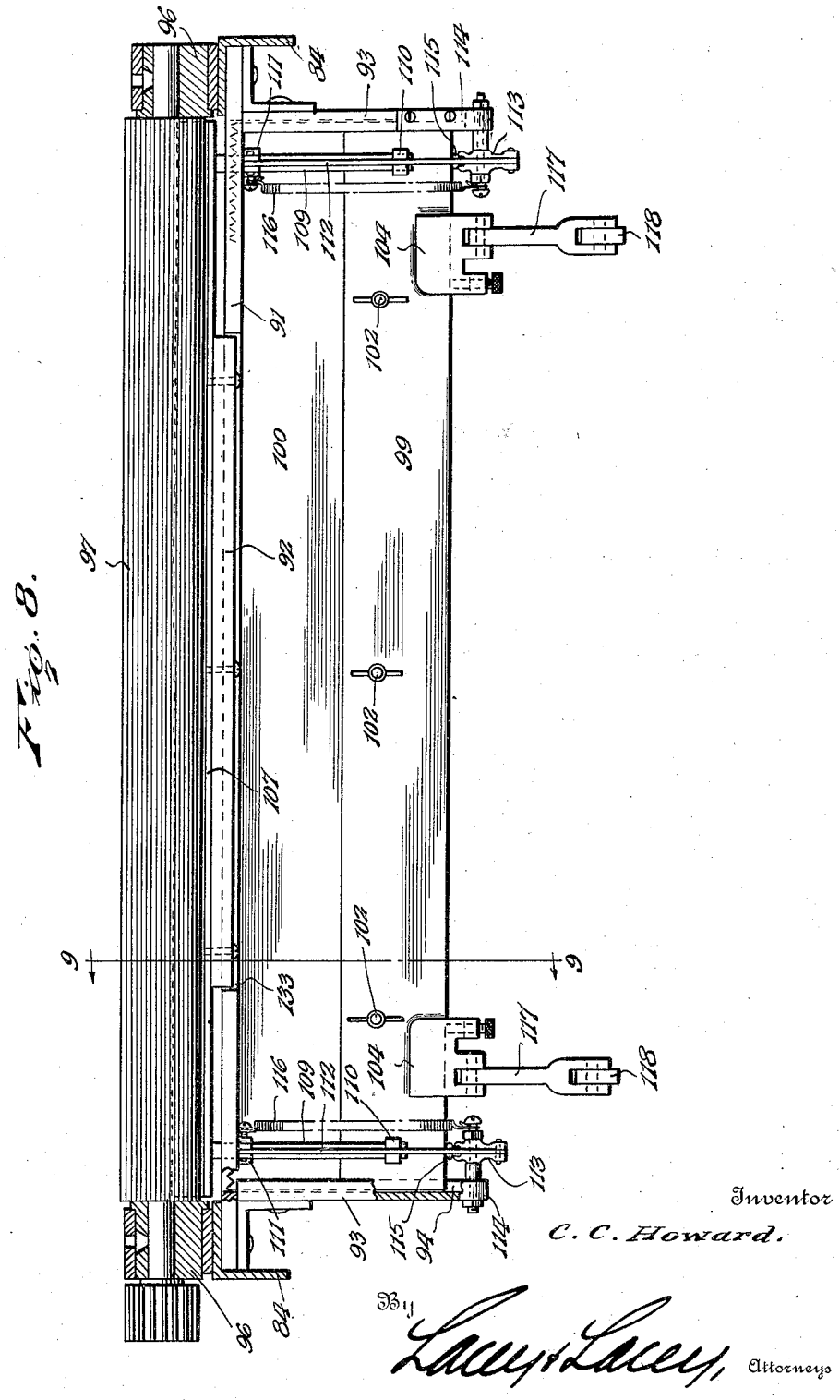

Aug. 19, 1930.  C. C. HOWARD  1,773,457
SHEET CUTTING MECHANISM FOR BOOK MAKING MACHINES
Filed Nov. 22, 1928  12 Sheets-Sheet 9
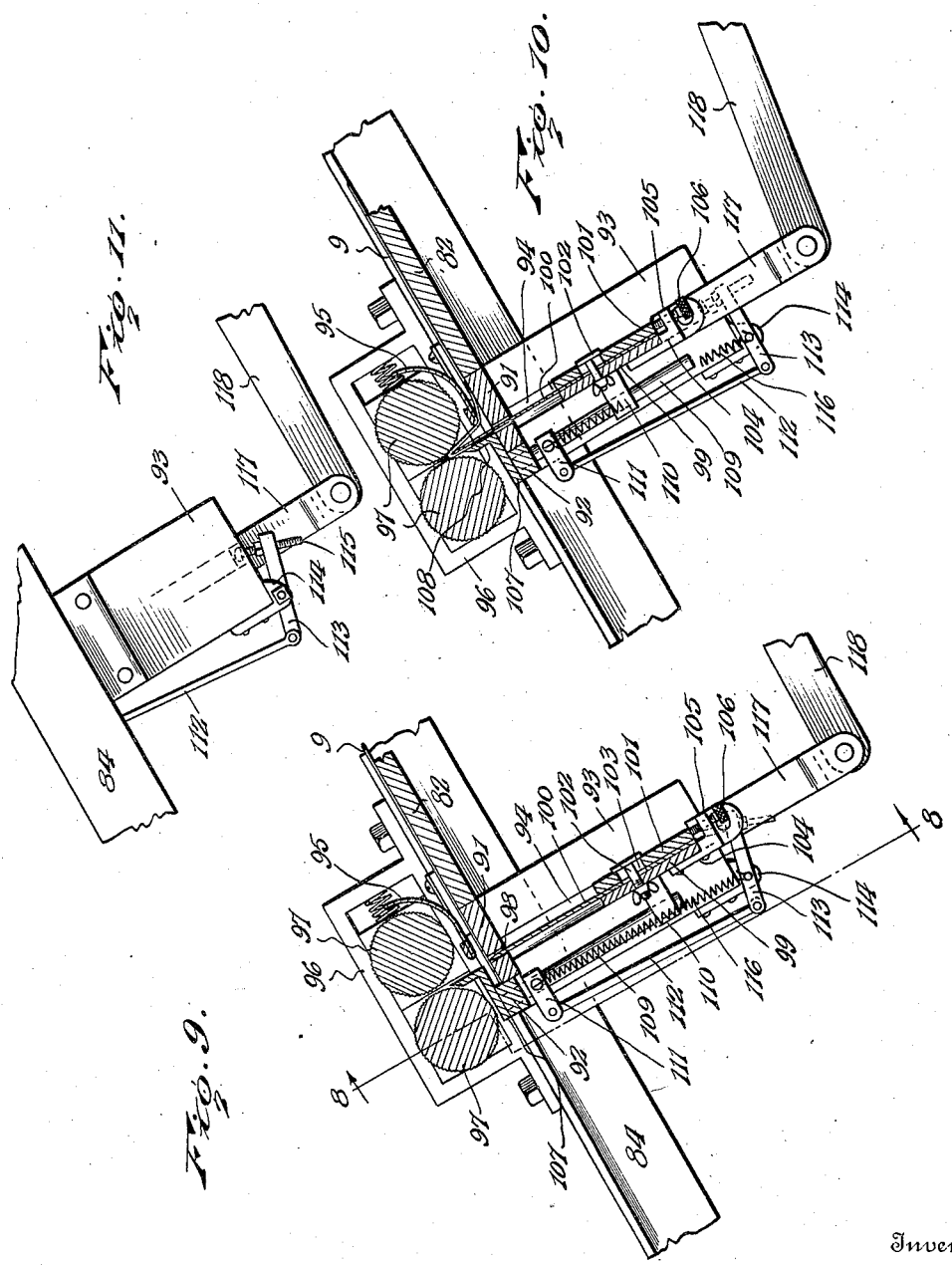
Inventor
C. C. Howard.
By Lacey & Lacey, Attorneys

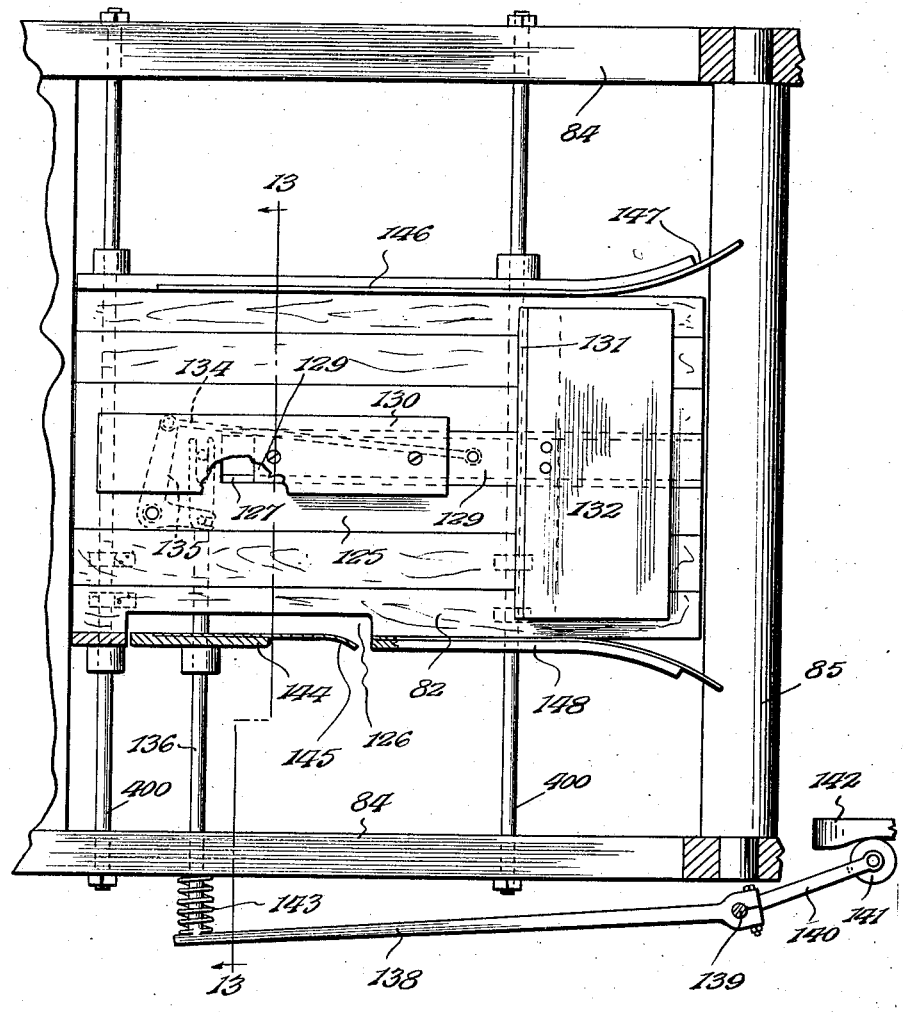

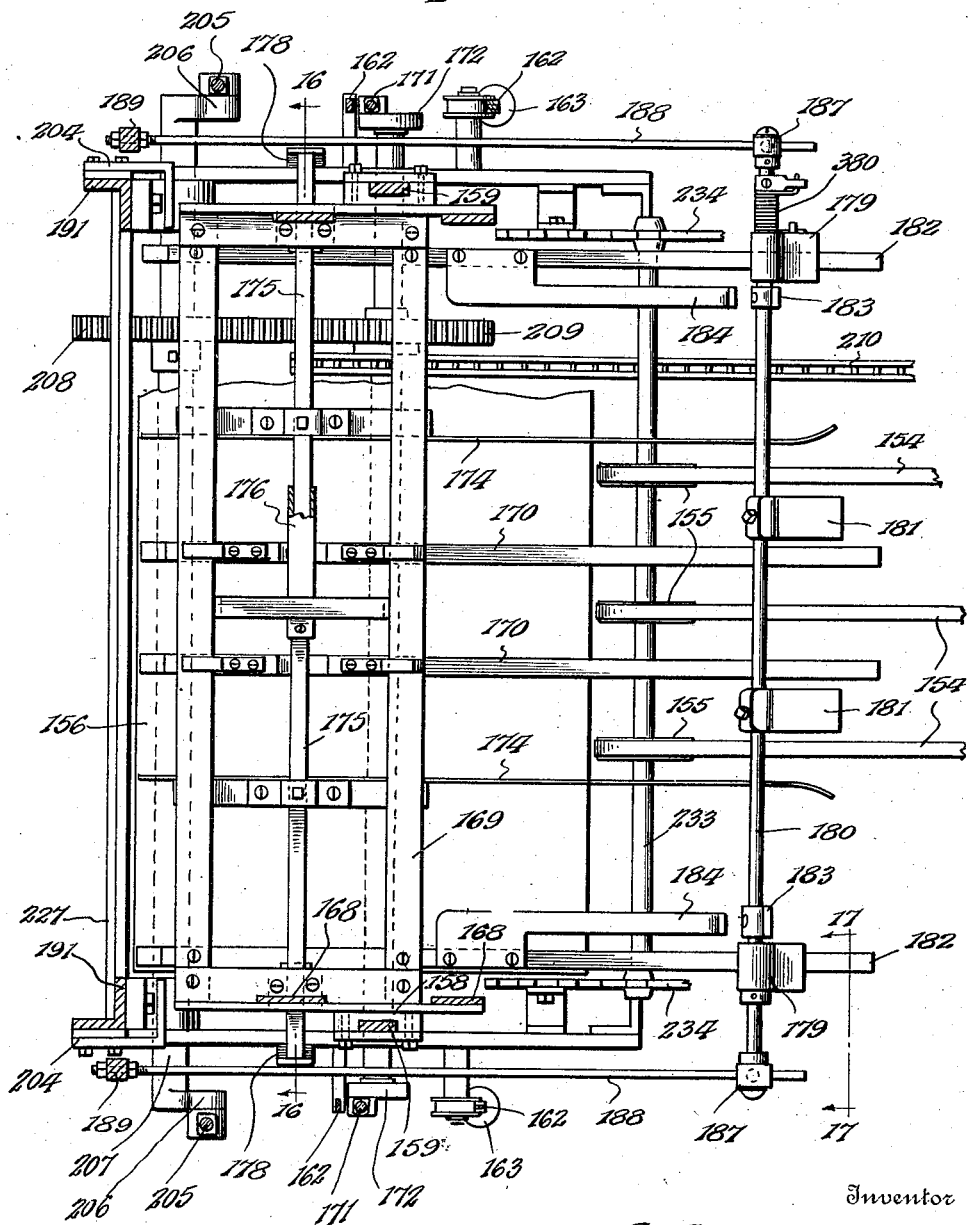

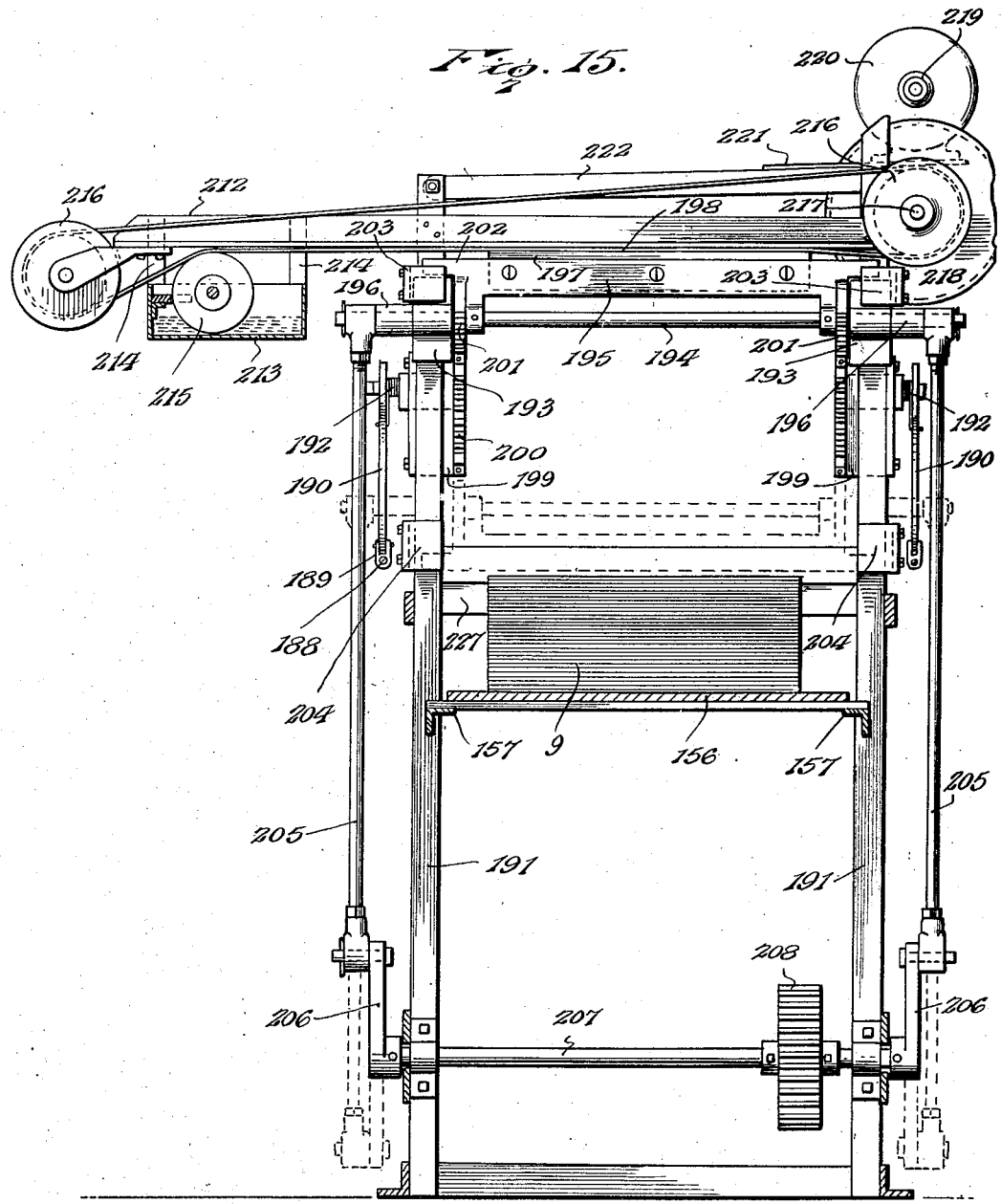

Patented Aug. 19, 1930

1,773,457

UNITED STATES PATENT OFFICE

CHARLES C. HOWARD, OF LOUISVILLE, KENTUCKY

SHEET-CUTTING MECHANISM FOR BOOKMAKING MACHINES

Application filed November 22, 1928. Serial No. 321,216.

This invention is embodied in a machine for assembling leaves or sheets in book form and securing them together and the object, generally stated, is to provide mechanism whereby separate sheets or leaves will be cut along the edges which later become the back edges of the book into tongues, the tongues on successive sheets being relatively staggered, then fold the free ends of the tongues for a portion of their length and then apply adhesive to the folded ends of the tongues whereby the alined tongues will be secured together. The mechanism embodying the present invention provides means whereby the leaves or sheets will be expeditiously and economically assembled and attached together ready to have the backing sheet and covers applied thereto. The invention is intended more particularly for use in producing check books or other blank books which in use are to be opened flat and which will remain flat when open without regard to the point in the thickness of the book at which it is opened. I have heretofore produced a blank book in which the several sheets or leaves are bound together in such manner as to produce a book which will open flat, and in such book the several leaves have been formed with tongues along their binding edges with the tongues of the alternate leaves relatively staggered so that the application of adhesive to the free end portions of the tongues will cause the tongues on alternate leaves to be attached, relative transverse shifting of the leaves being prevented by the tongues on one leaf being disposed in the spaces between the tongues on an adjacent leaf. The present invention provides means whereby the leaves will be successively and in a continuous process presented to cutting devices and have the tongues produced thereon, then fed to folding means whereby the free end edges of the tongues will be doubled on themselves for a short portion of their lengths and then presented to means for applying adhesive, the alinement of the sheets or leaves being maintained at each step in the operation. An apparatus embodying the invention is illustrated in the accompanying drawings, and the invention resides in certain novel features which will be hereinafter first fully described and then more particularly pointed out in the appended claims.

In the drawings:

Fig. 6 is an enlarged longitudinal section on the line 6—6 of Fig. 5,

Fig. 7 is a detail transverse section on the line 7—7 of Fig. 6,

Fig. 8 is a transverse section on the line 8—8 of Fig. 4,

Figure 1:
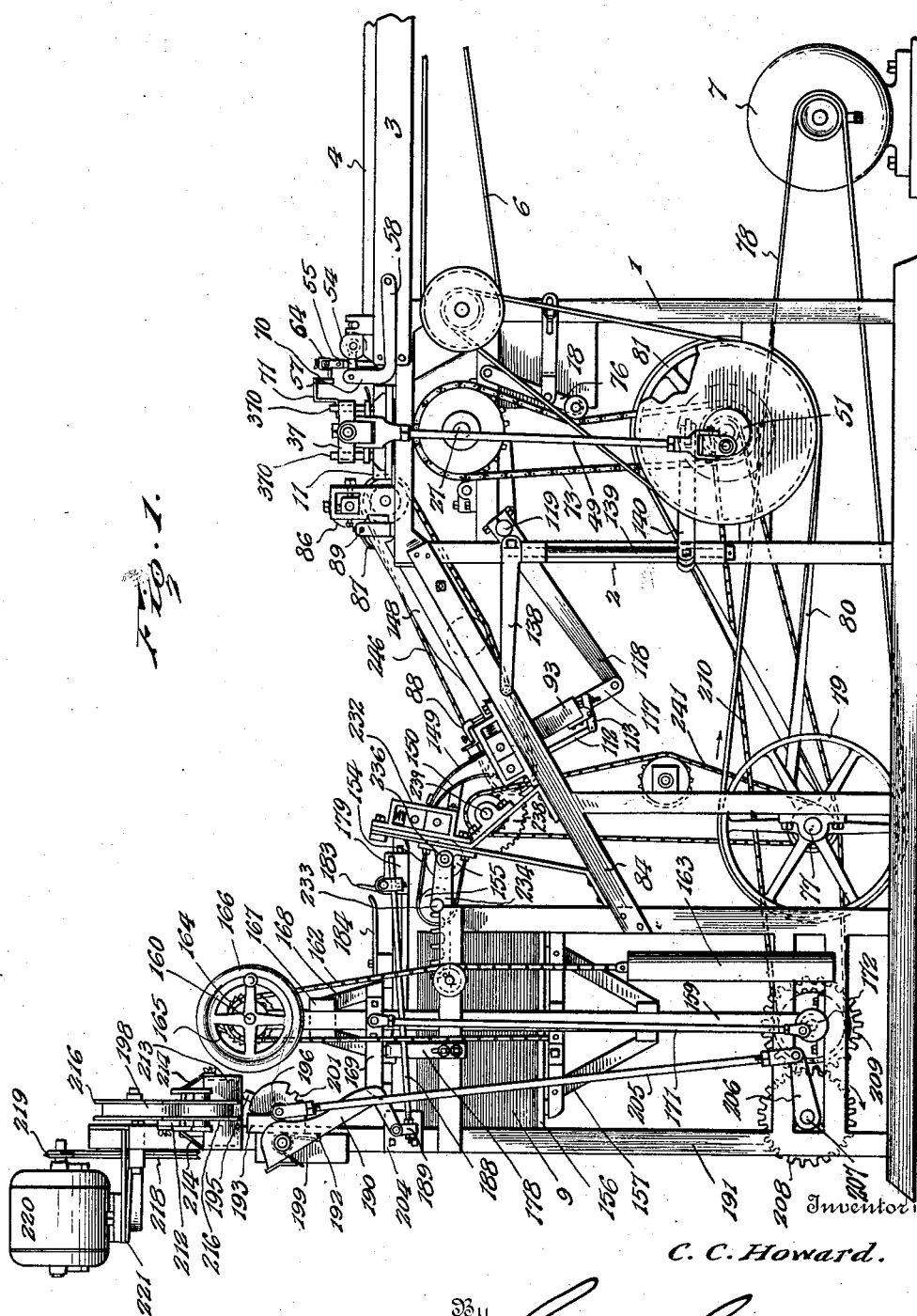
Figure 1 is a side elevation of a machine embodying the invention.

Fig. 9 is an enlarged detail section on the line 9—9 of Fig. 8, the plane of the section shown in Fig. 8 being also indicated by the line 8—8 in this figure in order to facilitate an understanding of the structure, Fig. 10 is a view similar to Fig. 9 and showing the parts in a different position, Fig. 11 is a slightly enlarged detail of a part of the mechanism shown in Figs. 9 and 10, Fig. 12 is an enlarged plan view of a portion of the machine showing the means whereby the sheets are guided to the folders and the alinement of the sheets maintained, Fig. 13 is a transverse section on the line 13—13 of Fig. 12, Fig. 14 is a plan view, with parts in horizontal section, of the assembling means whereby the cut and folded sheets are presented to the glue-applying elements, Fig. 15 is a sectional elevation of the glue-applying devices and the parts immediately adjacent and cooperating with the same, Fig. 16 is a detail section on the line 16—16 of Fig. 14, and Fig. 17 is a detail section on the line 17—17 of Fig. 14.

In carrying out the invention, there is provided a suitable framework which may be of any detail design possessing the requisite rigidity. At that end of the apparatus which receives the sheets or leaves for the initial operation, the framework comprises standards 1 and 2 and suitable cross bars or other bracing elements whereby the standards will be held in proper spaced relation. Extending from the standards 1 is a frame 3 which supports a table 4 over which feeder belts 5 travel. These feeder belts may be driven by any approved mechanism, and in Fig. 1 I have indicated a portion of drive belts 6 receiving motion from a motor 7 through intermediate elements which will be understood upon reference to Fig. 1. The feeder belts are trained around an idle roller 8 mounted in suitable bearings at the delivery end of the table 4 over the supporting frame and the sheets, one of which is indicated at 9, are placed singly upon the feeder belts by hand or through a feeding machine of any approved construction and operation.

Referring particularly to Fig. 6, it will be noted that the sheet or leaf passes from the feeder belts onto a support comprising a table 10 having transverse guide ribs or rails 11 along its opposite edges, said guide ribs or rails being beveled, as shown at 12, whereby they will slightly overhang the top of the table, and slidably resting on the table and fitted to and between the guide rails is a template 13 having equi-distant openings 14 formed therethrough, said openings being vertically alined with a slot 15 formed through the table 10 and extending transversely of the same. The openings 14 are spaced apart distances corresponding to the spacing desired for the tongues to be formed upon the several sheets or leaves and have the same dimensions and form as the spaces which will be cut in the leaves. The table 10 and the rails 11 are secured to angle bars 16 which extend across the machine and are rigidly secured to the bars connecting the upper ends of the standards 1 and 2, as will be understood upon reference to Fig. 4. Below the table and extending downwardly from a point between the angle bars 16 is a chute 17 whereby the pieces cut from the ends of the several sheets will be directed into a receptacle 18 supported on the frame, as shown clearly in Fig. 4. Disposed within and extending vertically through the slot 15 and some of the openings 14 are stop fingers 19 which rise from and are preferably formed integral with a plate 20 set on edge and disposed below the table, as shown in Fig. 5, the stop fingers being intended to project above the surface of the template 13 into the path of the advancing sheet so that the travel of the sheet will be arrested with its forward edge over the several openings 14 in proper position to be acted upon by the cutters, uniformity in the location of the cuts and the tongues formed thereby being thereby attained. Secured to and depending from the plate 20 are arms 21 which are provided at their lower extremities with brackets 22 between which a rod 23 extends, and mounted upon said rod are rollers 24 which are somewhat elongated, as shown in Fig. 5, and are adapted to bear against the cam flanges 25 of a roller 26 which is secured upon a power shaft 27 extending across the frame and journaled in suitable bearings provided therefor, as indicated at 28. Studs 29 are also provided at the lower extremities of the arms 21 and to these studs are attached the lower ends of retractile springs 30 which extend upwardly therefrom and have their upper ends attached to a fixed element, such as the table 10, as shown clearly in Fig. 6. The springs 30 are normally retracted so that the stop fingers will be held at the upper limit of their vertical movement and the rollers 24 are held in engagement with the respective cams 25 by the springs so that it will be understood that rotation of the cams will effect downward movement of the stop fingers and upward movement thereof is effected by the contraction of the springs. The motion is so timed that the downward travel of the stop fingers will occur through such periods as will permit the cut leaves to pass beyond the cutters and the upward movement will occur after a cut leaf has passed and before a second leaf has reached the cutting position. The plate 20 has the upper ends of links 31 pivoted thereto near its ends and the lower ends of said links are pivoted to brackets 32 having a vertical pivotal movement upon the frame, these links serving to maintain the proper relation of the stop fingers to the template during the transverse shifting of the parts which occurs as a cut sheet is being discharged and a second sheet is being brought into position to be cut. To effect the mentioned transverse movement, a grooved cam disk 33 is secured upon the end of the shaft 27, and to the end of the template there is secured a guide finger 34 depending from the plate and having its lower end engaged in the cam groove 35, as shown in Fig. 5.

The cutters 36 are carried by a head block 37 and consist of solid blocks of the form and dimensions desired for the cuts to be made in the several sheets and are separately secured to the head block by cap screws 38 inserted through the head block and engaged in the respective cutters, as shown in Fig. 6, so that the cutters will be firmly secured in place but any one cutter may be removed if necessary without requiring the removal of the entire gang of cutters. The cutters are alined vertically with the respective stop fingers and the openings 14 in the template and the cutters and the stop fingers will, of course, operate in consonance. A presser plate 39 is carried by the head block 37 and openings 40 are formed through this presser plate alined with the cutters and the openings 14 and of like form and dimensions. The presser plate is suspended from the head block by cap bolts 41 inserted loosely through the head block and having their ends engaged in the presser plate and provided in such numbers as may be deemed desirable. The bolts 41 project above the head block and nuts 42 are mounted thereon and turned home against the head block while springs 43 are disposed around the respective bolts between the presser plate and the head block and tend constantly to depress the presser plate, the tension of the springs being regulated by adjusting the nuts 42 in an obvious manner. Buffer springs 44 are provided at the ends of the presser plate between the same and the template, being seated in recesses 45 in the upper surface of the template and held in place by bolts 46 inserted through the ends of the presser plate and secured in the template, as will be best understood upon reference to Fig. 5. The springs 44 cushion the impact of the presser plate upon the template and the sheet or leaf while the springs 43 effect a proper holding engagement with the sheet or leaf so that it will be smooth and will not buckle or give way when engaged by the cutters. The cutters are obviously intended to reciprocate vertically and, to effect such reciprocation, brackets 47 are secured to the ends of the head block and project laterally therefrom and have pivoted thereto forks 48 carried by the upper ends of pitmen 49 which extend downwardly and have their lower ends connected in a similar manner to wrist pins 50 on crank disks 51, said crank disks being secured on the ends of a transverse shaft 52 which is mounted upon the frame in the lower portion thereof. The head block and presser plate are slidably mounted on and guided by pins or posts 370 rising from and anchored in the template and passing through openings provided therefor in the head block and the presser plate.

Secured to and projecting from the presser plate 39 at that edge thereof which is presented to the entering sheets are guide fingers 53 having their free ends slightly upturned so that, if a sheet or leaf should tend to jump upwardly as it passes onto the template, it will engage the guide fingers and be thereby turned down to the template, as will be understood. It is also desirable to guard against a sheet failing to move promptly after it has been cut and to that end I provide rollers 54 which are carried by arms 55 extending from a rod 56 fitted in and extending between posts 57 rising from levers 58 which are pivoted upon the sides of the feeder frame 3, as shown clearly in Figs. 1 and 2, and one of said levers 58 is extended beyond the respective post 57 and is equipped at its free end with a roller 59 resting upon a cam disk 60 secured to the outer side of the cam disk 33. It will be understood that during the shifting of the cutter mechanism transversely the presser rollers 54 will be held raised but when the sheets are to be fed a low part of the cam disk 60 will be brought under the roller 59 so that the levers 58 may then drop by gravity and the rollers 54, consequently, be brought down onto the sheet or leaf 9, holding the same to the traveling feed belt 5 below the same and causing it to be frictionally engaged by the belt and fed over the table and template.

The feed table 4 is provided with a guide rail 61 along one side edge having a groove 62 in its inner surface flush with the feed table, and I provide a jogger which is operated to cause the adjacent edge of the advancing sheet to be inserted in said groove so that all the sheets will be alined as they pass to the cutters and, consequently, the cuts will always be made through the sheet at the proper relation to the side edges of the same. Secured to the side bars or frame 3 and rising above the same are standards 63 having a cross bar 64 secured in and extending between their upper ends. Adjustably secured upon this cross bar is a bracket 65 and pivoted to the lower side of said bracket is a vibratory arm 66 which is movable toward and from the sheet or leaf so that if the sheet should be out of alinement the free end of this arm will impinge against the edge thereof and shift the sheet laterally so that it will be caused to enter the groove 62 and ride against the guide rail 61. The end of the vibratory arm 66 is disposed within the opening or space between the feed table and the supporting bar 67 secured to the forward rail 11 and projecting therefrom toward the rollers 8 about which the feed belts are trained. This arrangement is shown clearly in Fig. 6 wherein it will be noted that the end of the vibratory arm projects somewhat below the plane of the sheet and will, of course, impinge against the same if the sheet be within the range of movement of the arm. To adjust the throw of the arm and prevent it buckling or crushing the sheet, a stop screw 68 is provided in the end of a hanger 69 which is secured to and depends from the bar 64, as shown in Fig. 7. By properly adjusting the screw 68, the throw of the vibratory jogger arm may be nicely regulated and the device adjusted to the width of the sheets which are to be assembled in book form. An ample range of adjustment for the arm is attained by having the bracket 65 adjustably secured upon the bar 66. To operate the jogger arm, a leaf spring or resilient plate 70 is secured to the pivot of the arm and projects upwardly and laterally therefrom to bear against the under side of an actuator plate 71 secured upon the head block 37 and projecting upwardly and rearwardly therefrom over the plate 70, as shown clearly in Fig. 6. It will now be understood that, when in the operation of the machine, the head block is moved downwardly to effect cutting of a sheet the actuator plate 71 will bear upon the plate 70 and rock the jogger arm and the resiliency of the plate 70 will cause it to yield to impacts and aid in avoiding any tendency of the jogger to crush or buckle the sheet. The jogger arm is moved away from the sheet by a retractile spring 72 having one end attached to the arm below the pivot of the same and its opposite end attached to the bracket 65, as shown clearly in Fig. 7.

Motion is imparted to the shaft 27 from the shaft 52 through the medium of a sprocket chain 73 trained about a sprocket 74 on the shaft 52 and a sprocket 75 on the shaft 27, a chain tightener 76 being provided to engage the intermediate portion of the chain 73 and maintain the tension thereon in an obvious manner. The shaft 52 is driven from a shaft 77 which receives motion from the shaft of the motor 7 through a belt 78 and a drive wheel or pulley 79 secured upon the shaft 77 and about which the belt 78 is trained. The shaft 77 is also equipped with a transmitting pulley having a crossed belt 80 trained about the same and said belt 80 is trained about a pulley 81 on the shaft 52.

It is thought the operation of the mechanism thus far described will be readily understood. The sheets or leaves are fed separately and successively onto the rails 11 and the template 13 and are brought to rest by impinging against the stop pins 19. The head block 37 is moved downwardly through the action of the crank disks 51 and the pitmen 49 and the presser plate 39 is thereby brought to bear upon the sheet which has met the stop pins so that it will be held perfectly smooth and firm. The stop fingers are simultaneously withdrawn from the path of the sheet and the knives 36 carried across the sheet so that spaced tongues will be formed in the end edges of the sheet presented to the knives. As soon as the cuts have been made, return movement of the parts starts, the presser plate 39 freeing the sheet so that it may pass over the front rib or rail 11 and make way for a second sheet to be cut. The cams 25 will retard the rising movement of the stop fingers so that they will not enter the path of the sheets until after the cut sheet has been discharged and during this interval the template, stop fingers, presser plate and cutters will be shifted transversely through the action of the cam 33 so that, when the cutters are brought down onto the second sheet, the cuts made therein will be staggered relative to the cuts made in the first sheet. The rollers 24 are long enough to accommodate the transverse movement of the template and the stop fingers so that in either position they will be in operative engagement with the cam members 25. The operation described is continued indefinitely and the sheets are very rapidly cut.

Figure 3:
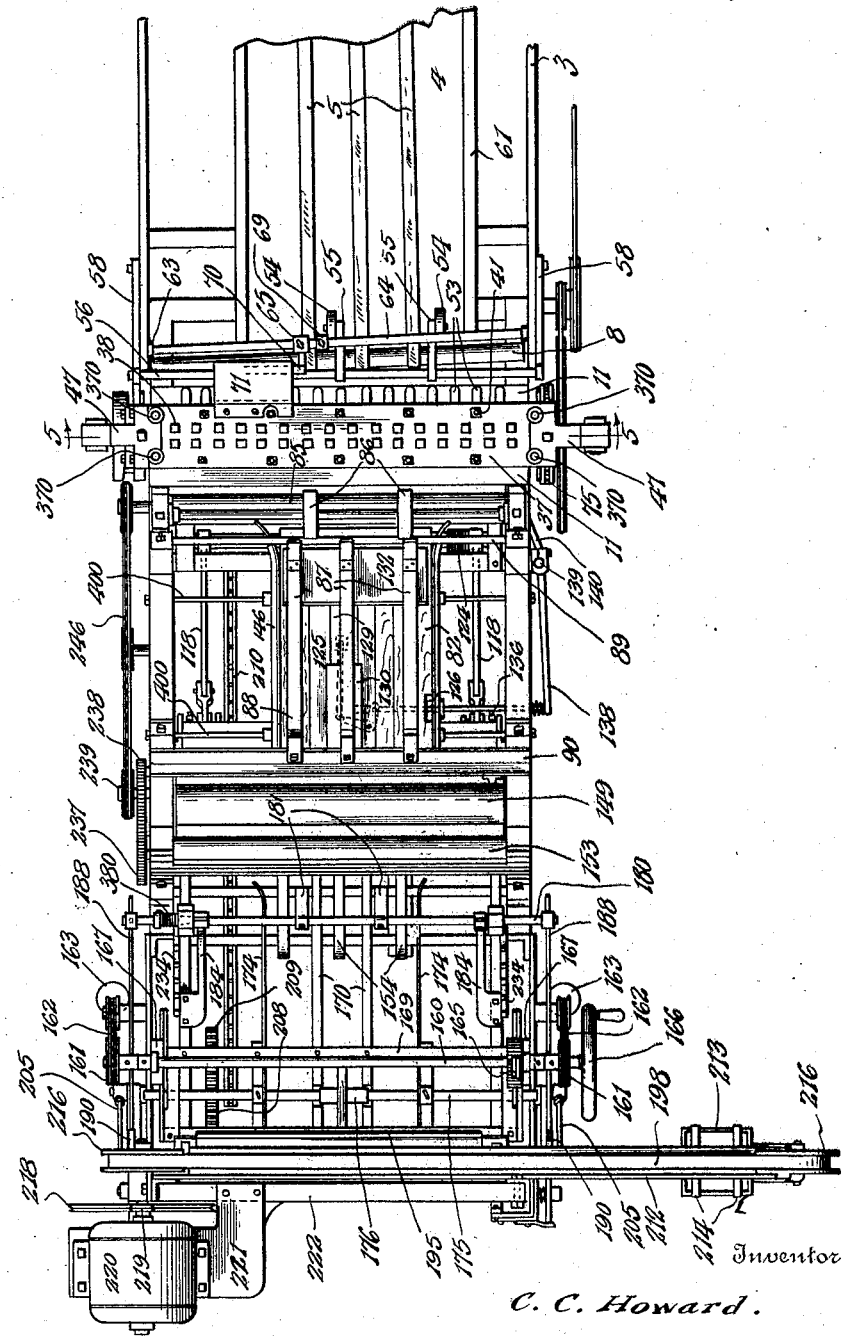
Fig. 3 is a plan view.
Figure 4:
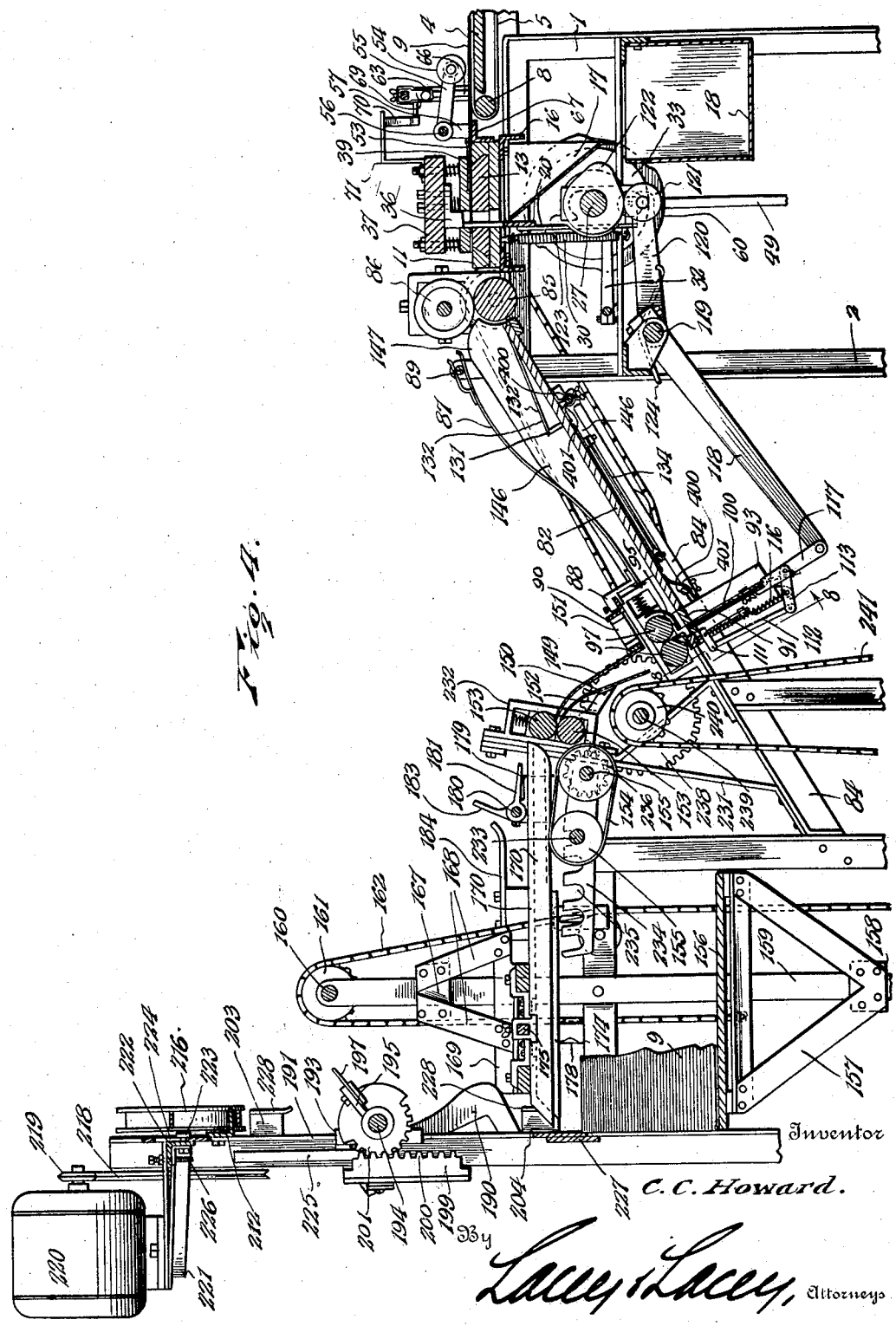
Fig. 4 is an enlarged longitudinal section.
Figure 5:
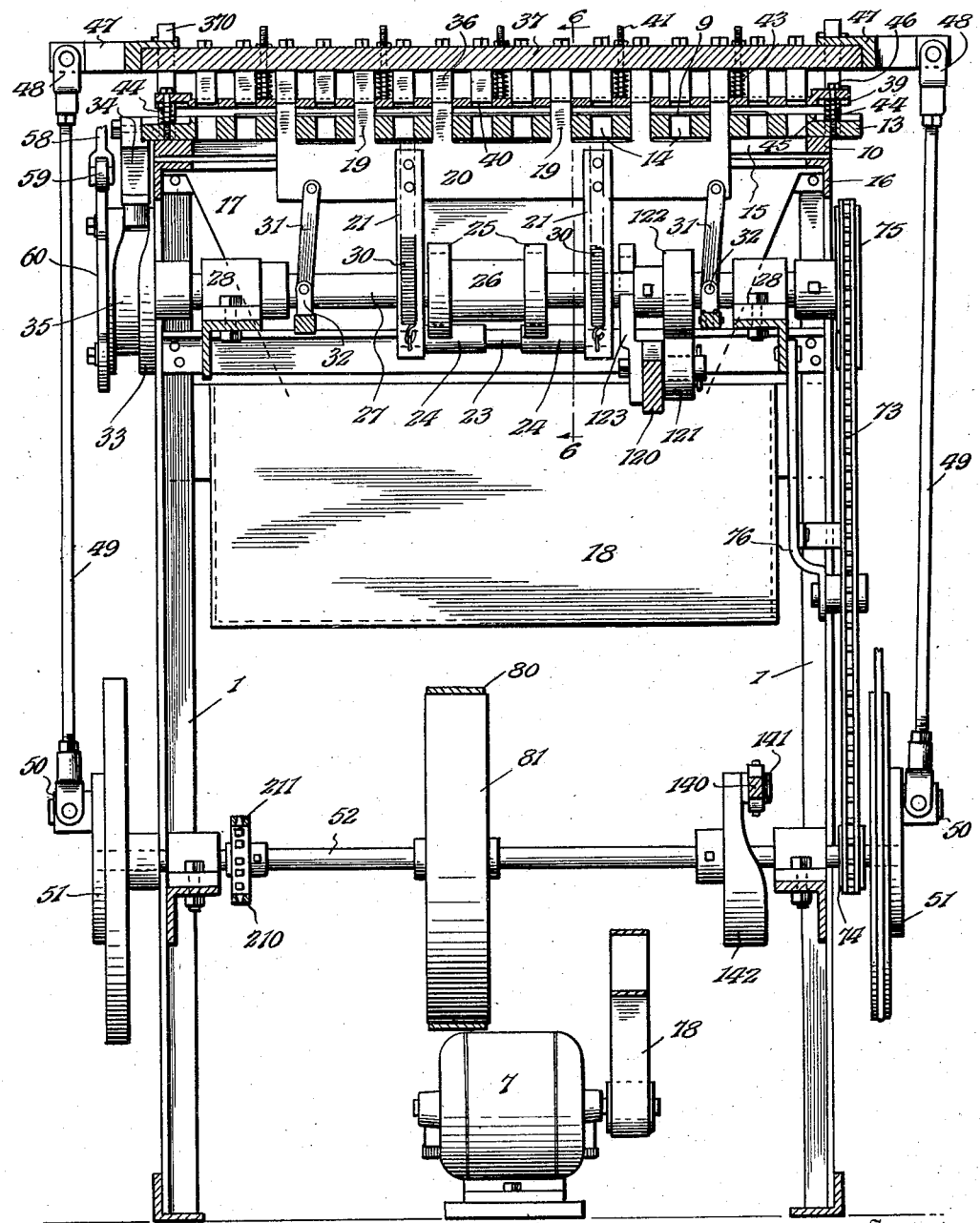
Fig. 5 is a transverse vertical section on the line 5—5 of Fig. 3.

From the cutters, the sheets pass rearwardly into a chute consisting of an inclined table 82 carried by frame members 84 and having its upper end arranged immediately adjacent a pair of feed rollers 85 and 86 which are located immediately at the rear of the cutting devices, as shown in Fig. 4, the roller 85 being a hard surface positively driven roller and the upper roller 86 being a presser roller having a more or less resilient working surface and resting by gravity upon the roller 85. The advancing edge of the sheet with the tongues cut thereon passes directly from the cutting table to the bight of the rollers 85 and 86 and will, of course, be gripped thereby and fed into the chute, and preferably the upper presser roller will be provided with rather narrow peripheries and arranged in a pair, as shown in Fig. 3, while the lower roller will be continuous and extend across the entire width of the machine. Guard fingers 87 are provided at the rear of the feed rollers and extend longitudinally above the chute so that the leaves or sheets will be prevented from flying over the chute and will be turned down into the same, it being understood that, in actual operation, the action is so rapid that the sheets pass from the cutting mechanism at very high speed and are apt to fly some distance beyond the feed rollers after leaving the latter. The guards 87 are preferably leaf springs secured at their lower ends to brackets 88 and having their upper ends supported by a cross rod 89 secured in any approved manner to the main frame, the brackets 88 being secured on an angle bar 90 which extends across the main frame above and in advance of the folding mechanism. At the lower end of the table 82 is a slotted cross bar 91 over which the cut end edge of the sheet comes to rest, a transverse stop bar 92 being arranged adjacent the lower edge of the slotted bar 91 in the path of the sheet, as shown in Fig. 9. Depending from the cross bar 91 and the frame bars 84 are guide plates 93 each having a groove 94 in its inner face. Immediately over and spaced from the rear edge of the slotted bar 91 is a guiding shield 95 which is curved upwardly and serves as a deflector so that if a sheet advancing to the folding mechanism should tend to rise from the table 82 it will be turned back onto the same by this deflector. Carried by bearings in brackets 96 secured on the frame bars 84 are rollers 97 which have slight longitudinal corrugations in their peripheries and are so disposed that the bight defined by them will be alined with the slot 98 in the cross bar 91, and it is to be noted that the rear edge of the deflector 95 is disposed in a plane slightly in advance of a plane passing through the slot 98 and between the rollers 97. Slidably mounted in the grooves 94 is a head plate 99 and a folder blade 100, the folder blade having a reinforcing plate 101 secured to its lower end portion whereby buckling of the blade is prevented and the blade and said plate being secured to the head plate 99 by set bolts 102 inserted through vertically extending slots 103 in the blade and the plate 101, as shown clearly in Fig. 9. This construction permits the blade to be adjusted to compensate for wear and also to attain the desired throw of the blade in the folding operation. Secured to the lower edge of the head plate 99 is a bracket or a plurality of brackets 104 which have lips 105 projecting under the lower edges of the blade and the reinforcing plate 101, and in each said lip is mounted a set screw 106 bearing against the lower edge of the reinforcing plate and facilitating its adjustment in an obvious manner. The upper end or the working edge of the blade is intended to be within the slot 98 when the blade is in its lowest position so that it will be in position to immediately engage a sheet or sheets extending over the slot. The stop bar 92 has a bracket 107 secured on its upper side and projecting forwardly therefrom to aline with the rear wall of the slot 98, and at the front edge of said bracket is an upstanding lip 108 which passes into the space between the rollers 97 and is beveled so that it may fit close to the adjacent roller. Guide pins or rods 109 depend from the stop bar 92 at or near the ends thereof and pass through guide lugs 110 projecting from the head plate 99, and secured to said guide pins 109, adjacent the upper ends thereof, are brackets 111 to which are pivoted the upper ends of links 112, the lower ends of said links being pivoted to the rear ends of levers 113 which are fulcrumed between their ends upon brackets or fulcrum blocks 114 secured to the lower corners of the guide plates 93, the forward ends of said levers projecting under the head plate 99 and the reinforcing plate 101. Abutment screws 115 are fitted through the free ends of the levers 113 to be engaged by the head plate 99 or the reinforcing plate 101 when the folder blade is lowered, and springs 116 extend between and are attached to the fulcrum of the respective lever 113 and the bracket 111 so that the springs tend by their contraction to lower the stop bar 92 and the bracket 107 carried thereby. Upon referring to Figs. 9 and 10, it will be understood that, when the folder blade is lowered, the levers 113 will be rocked so that the stop bar 92 will be raised and will be interposed in the path of a sheet advancing over the table 82 and the cross bar 91. As the upward movement of the folder blade occurs, the springs 116 will draw the stop bar 92 downwardly so that the projecting portion of the bracket 107 will rest upon the edge of the sheet at the rear of the slot 98 and will yieldably hold the sheet so that as the upward movement of the folder blade continues the edge of the sheet will be folded or doubled upon itself and moved past the lip 108 and carried into the bight of the folding rollers 97, as shown in Fig. 10, whereby the end edges of the several tongues will be doubled on themselves for a portion of their length.

Pivoted to and depending from the brackets 104 are links 117 which have their lower ends pivoted to crank arms or levers 118 extending upwardly and forwardly and secured to a rock shaft 119 journaled in suitable bearings secured upon the standards 2. Secured to the rock shaft 119 is a crank arm 120 which extends forwardly to a point below the shaft 27 and is equipped with a roller 121 bearing against a cam 122 secured on said shaft so that as the high part of the cam rides upon the roller 121 the crank 120 will be lowered and the levers 118 moved upwardly to carry the folder blade 100 into the folding position. In order that the blade may not be moved upwardly to such an extent that it would be gripped by the rollers 97, a stop member 123 is secured to the end of the crank 120 and is slotted so that it may pass the shaft 27, as will be understood upon reference to Fig. 4. When the crank 120 is swung downwardly, the stop member 123 will, of course, follow the movement and the upper end of the slot or opening therein will eventually be brought into contact with the shaft 27 so that the blade cannot move into binding relation with the rollers 97. The crank 120 is, of course, so mounted upon the rock shaft 119 that it may have some lost motion thereon under the influence of the cam 122 if said cam should continue to act on the roller 121 when the stop member 123 is in contact with the shaft 27 but under normal conditions the frictional engagement of the crank with the shaft 119 will transmit the movement of the crank to the shaft. To maintain the engagement of the roller 121 with the cam 122, a tension spring 124 is provided about the shaft 119 having one end engaged with the crank and its other end engaged with an adjacent frame member.

The action of the folding mechanism is so timed relative to the action of the cutters that two sheets or leaves will be brought into position for folding before the folder blade moves upwardly. This feature of the machine is desirable because the tongues on adjacent leaves are staggered and the tongues on one leaf fit within the spaces between the tongues on another leaf and by folding two leaves simultaneously the relation of the tongues is established and they are so presented to the glue-applying elements that the glue will be applied through the full width of the leaf at each operation. It is essential that the leaves be properly alined when presented to the folder mechanism and there are, therefore, provided jogger devices mounted upon the table 82. The table 82 has a central longitudinal plate 125 set therein and in one side edge of the table 82 is a longitudinally extending recess 126. The plate 125 has a longitudinal slot 127 formed therein, the walls of the slot being rabbeted, as shown at 128 in Fig. 13, and carried by said rabbeted walls is a slide 129 to the upper side of which is secured a plate 130 which serves as a cover for the slot and rests upon the plate 125 to aid in supporting the slide. Secured to the rear end of the slide 129 and projecting transversely thereof to play over the table 82 is a jogger bar 131, from the upper edge of which a cover and guide plate 132 extends at an angle to the top of the table so as to meet the table and form a skid over which the advancing sheets may pass. The sheets, of course, will drop onto the table at the rear of the jogger bar 131 and said bar is reciprocated so that the sheets will be pushed rearwardly to come to rest against the stop bar 92, and it may be noted at this point that the rear edge of the slotted bar 91 is longitudinally recessed, as shown at 133, to accommodate said stop bar and permit the lip 108 to extend the full length of the rollers 97. To effect the desired jogging reciprocatory motion of the bar 131, a link 134 is provided below the table and the plate 125 and has its front end pivoted to the under side of the slide 129 while the rear end of the link is pivoted to the inner end of a bell crank 135 which is also fulcrumed on the under side of the plate 125. The outer end of the bell crank is pivotally attached to a pitman 136 slidably mounted in the frame bar 84, as indicated at 137, and having its outer end projecting through the frame bar 84 to be operatively engaged with the rocking arm 138. Said rocking arm 138 extends forwardly and is secured to a rock shaft 139 mounted vertically upon the adjacent standard 2 and at the lower end of said shaft 139 is secured a crank or rocking arm 140 which extends forwardly and is equipped at its forward end with a roller 141 bearing against a cam 142 which is secured upon the shaft 52. As the shaft rotates, the crank 140 will, of course, be rocked in a horizontal plane and this movement will be transmitted through the shaft 139 to rock the arm 138. When the high part of the cam 142 acts to rock the arm 140, the arm 138 will push the pitman 136 inwardly and the bell crank 135 will be, consequently, rocked to pull the jogger bar 131 forward and cause the end of the sheet to rest squarely against the stop bar 92. As the low part of the cam reaches the roller 141, an expansion spring 143, arranged between the rocking arm 138 and the frame member 84, will expand and rock the arm in the reverse direction so that the jogger bar will be moved upwarly upon the table 82. Carried by the pitman 136 to play within the recess 126 of the table is a jogger rail or board 144 which extends longitudinally of the table and has its forward end turned outwardly, as shown at 145, while at the opposite side of the table is a fixed rail 146. When the pitman 136 is reciprocated, the jogger board or rail 144 will, of course, move therewith and it will impinge against the side edge of the sheet presented thereto and move the sheet over to bear against the fixed rail 146 so that the sheets will be positively alined and will be superposed in registration over the folder blade. The fixed rail 146 has its forward end curved outwardly, as shown at 147, and alined with the outer side of the recess 126 is a similar rail 148 so that the sheets coming from the feed rollers 85 and 86 will be properly guided onto the table 82, and it will be noted upon reference to Fig. 4 that the ends of the guide rails 146 and 148 are tapered so that they will enter the bight between the feed rolls. The table 82 is preferably composed of a plurality of parallel longitudinal abutting boards or strips of material, as will be understood upon reference to Figs. 12 and 13. These strips and the guide rails are carried by cross rods 400 secured in the frame bars 84, brackets 401 being secured to the under sides of the strips and adjustably mounted on the cross rods and the jogger rail 144 being secured upon the pitman in a similar manner. Preferably, as indicated in Fig. 4, the brackets 401 are of such form as to be easily engaged with or removed from the cross rods so that more or less table strips may be used as desired and the chute thereby adjusted to accommodate wider or narrower sheets.

The sheets with their folded edges pass upwardly between the rollers 97 which press the plies of the folds together and direct the sheets upwardly between guide plates 149 and 150 which are of arcuate form and converge toward their upper rear ends, and it may be noted at this point that the upper edge of the folder blade is preferably constructed with teeth so that it will more effectually engage the notched end portions of the leaves. The guide plates 149 and 150 are supported by brackets 151 and 152, respectively, secured conveniently upon the supporting frame structure, and the upper rear or delivery ends of these plates are arranged at the bight defined by rollers 153 arranged one above the other and serving to press the folds of the sheets and feed the sheets to the glue-applying devices. These rollers deliver the sheets onto feed belts 154 which are mounted upon suitable rollers or pulleys 155 and, in turn, deliver the sheets onto a table 156 which is so arranged that it will move downwardly as the number of sheets delivered thereto increases and will present the treated sheets to an open lower part of the supporting frame through which they may be withdrawn. This table is constructed with a reinforcing frame 157 on its under side and at the lower end of said reinforcing frame are guides 158 which slidably engage standards 159 forming part of the supporting frame of the machine so that the table will be guided and maintained in a stable condition in its movements. At the upper ends of the standards 159 is journaled a shaft 160 and upon said shaft at the ends of the same are secured sprockets 161 having chains 162 trained over the same. Each chain has one end attached to the platform 156 or its reinforcing frame while the other end of the chain carries a weight 163, the weights counter-balancing the platform and resisting downward movement of the same so that the table can only move downwardly at a rate corresponding to the rate of increase of the weight of the paper imposed thereon. The shaft 160 is also equipped with a ratchet wheel 164 and a pawl 165 is mounted upon the adjacent standard 159 to engage said ratchet wheel so that, when the pawl is in active position, the shaft cannot be rotated under the influence of the weights 163. At one end of the shaft there is also provided a hand wheel 166 whereby the shaft may be rotated to raise the platform when a book has been removed therefrom and it is to be placed in position to receive the sheets for a second book. Slidably engaged with the upper portions of the standards 159 are runners or brackets 167 from which braces or hangers 168 depend to carry a frame 169 which extends across the width of the machine and has secured to its under side parallel longitudinally extending presser bars 170 which project forwardly to points immediately adjacent the feed rollers 153 so that sheets carried from said rollers by the belts 154 will be caused to pass under the presser bars 170. The frame 169 is reciprocated vertically by pitmen 171 pivoted at their upper ends to the ends of the frame and at their lower ends to crank disks 172 carried by a transverse shaft 173. The presser bars 170 are thereby alternately lifted so as to permit the passage of sheets thereunder and then brought down so as to bear upon the sheets and hold them in position to receive the glue. Guide rails 174 are secured to the under side of the frame 169 and project rearwardly therefrom parallel with the presser bars 170 and in lateral relation thereto and the front ends of these guide rails are curved outwardly so that the sheets will be readily guided into the space between the rails. These rails are spaced apart a distance equal to the width of the sheets so that the sheets will be properly alined and in order that the sheets may be engaged by these rails and alined, even though they should be presented to the rails somewhat out of alinement, the rails are secured adjustably to a transverse reciprocatory bar 175 which is slidably mounted in bearings at the ends of the frame 169, a bar 175 being provided at each end portion of the frame and the inner ends of the bars being fitted within a coupling sleeve 176 which houses a spring 177 tending to press the bars apart. The outer ends of the bars 175 are adapted to bear against the beveled upper ends of stationary cams 178 which are vertically adjustable upon stationary parts of the supporting frame so that as the frame 169 is moved downwardly the bars 175 will be shifted laterally and the guide rails or jogger plates 174 will be moved inwardly to properly center the sheets. Slidably mounted upon side members of the main supporting frame are bearings 179 carrying a rock shaft 180 which extends across the frame above the feed belts 154 and the presser bars 170 as well as the jogger and guide rails 174. At points adjacent the presser bars and between the feeder belts, jogger arms 181 are secured to this shaft and project therefrom in such position that when the shaft is rocked these arms will impact against the rear ends of the sheets and will cause the same to be presented evenly to the glue-applying elements. The shaft 180 is reciprocated upon the frame members 182 through means which will be presently described and adjacent their bearings 179 have tappets 183 secured thereon, the tappets being normally in an upstanding position. Secured to the frame bars 182 at the rear of the shaft and its bearings are abutments 184 which are alined with the tappets 183 so that if the shaft be drawn rearwardly the tappets will be caused to impinge against the front ends of these abutments and thereby rocked, the shaft being conseqently rocked in its bearings so that the jogger arms 181 will be swung against the ends of the sheets. The bearings 179, as shown most clearly in Fig. 17, are constructed with guide feet 185 on their under sides which slidably engage the frame members 182 and are constructed with toes 186 engaging in grooves formed in the sides of the frame members whereby the bearings will be held in place. The shaft 180 is loose in the bearings 179 and secured upon the shaft at the ends thereof are brackets or blocks 187, in the lower ends of which are secured the front ends of pusher rods 188, said pusher rods extending rearwardly and having their rear ends secured in eyes 189 carried by the lower ends of angle levers 190 which are pivotally mounted upon the rearmost standards 191 of the main supporting frame. Normally these angle levers are in the position shown in Figs. 1 and 2 and the shaft 180 is spaced forwardly from the abutments 84. When the angle levers 190, however, are rocked rearwardly, the rods 188 pull the shaft rearwardly so that the tappets 183 are caused to impinge against the abutments 184. As the return movement of the shaft 180 carries the tappets from the abutments, the shaft is rocked and the tappets again set in upright position by a torsion spring 380 coiled about the shaft with one end fixed thereto and its opposite end fixed to the adjacent bearing, as shown clearly in Fig. 14.

Figure 2:
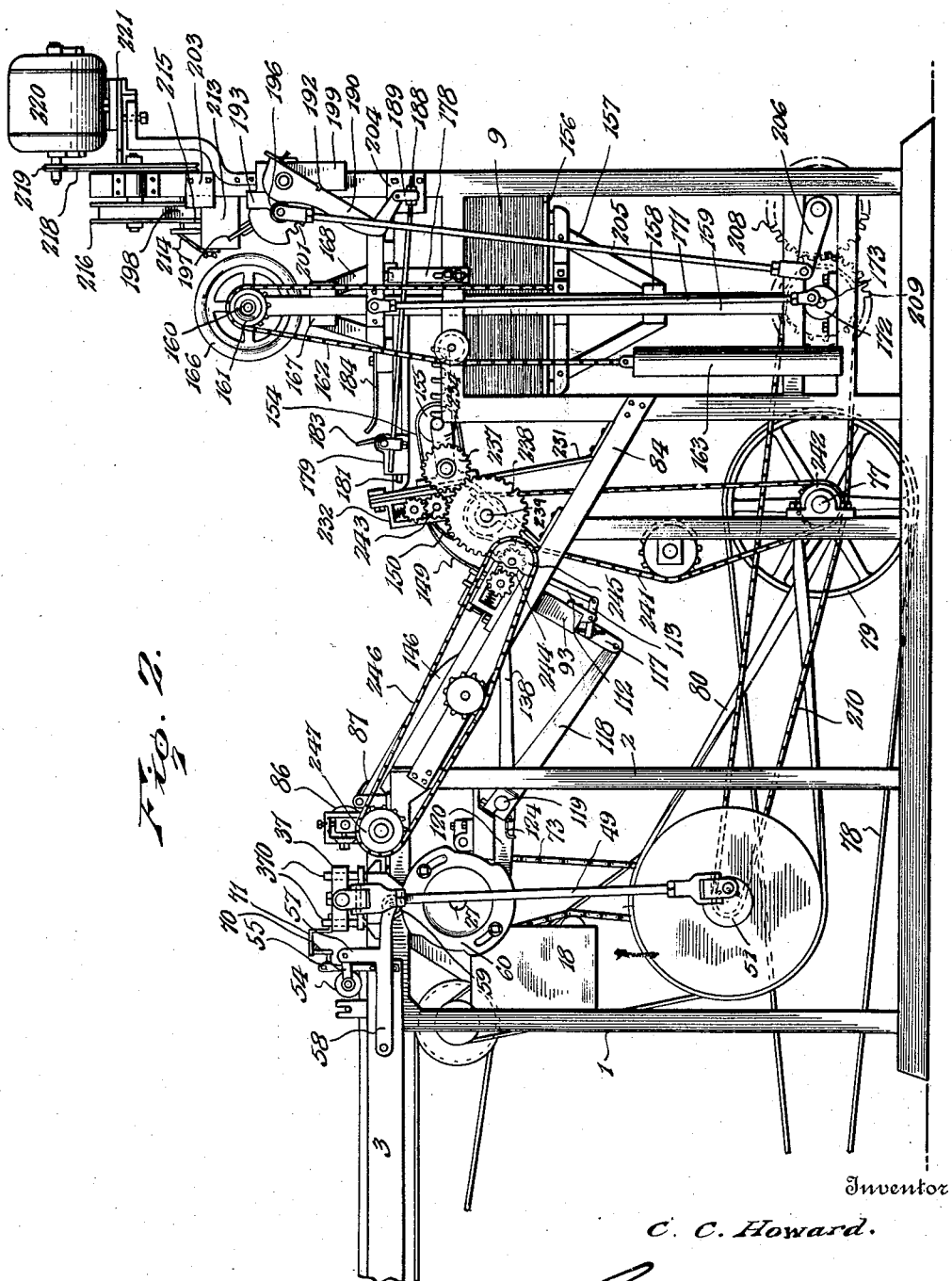
Fig. 2 is an elevation showing the opposite side of the machine.

It will be noted upon reference to Figs. 1 and 2 that the forward edges of the angle levers 190 are of an ogee shape and that the long arms of the angle levers project appreciably forwardly from the standards 191, a spring 192 attached to the frame at one end and having its opposite end engaged with the respective angle lever yieldably holding it in the position shown. Slidably mounted upon the standard 191 is a block 193 in which is journaled a shaft 194 carrying the glue-applying knife 195 and equipped with rollers 196 each adapted to engage one of the angle levers 190. It will be seen at once that, when the block 193 is moved downwardly, the roller 196 acting on the forward edge of the angle lever 190 will swing said lever rearwardly so that the shaft 180 will be drawn rearwardly and the described action accomplished. The glue knife 195 comprises a frame secured to the shaft 194 and extending longitudinally thereof, and a blade proper 197 secured longitudinally to the frame and adapted in one position to engage the glue-carrying belt 198 and in another position to apply the glue to the edges of the sheets upon the table 156. The pivot of the angle lever 190 is fitted in a block 199 which is secured to the adjacent standard 191 and projects to the inner side thereof where it is formed into or provided with a rack 200 in the vertical plane of a pinion 201 secured upon the shaft 194 so that as the shaft is moved vertically the pinion will be caused to ride over the rack in mesh therewith and, consequently, rock the shaft so that the knife will be reversed. The knife frame 195 has extensions 202 at its ends which at the respective limits of movement are engaged in keepers 203 and 204 respectively whereby the knife is caused to move in a true vertical plane in applying the glue to the sheets or receiving the glue from the conveying belt 198. Vertical movement is imparted to the knife shaft by pitmen 205 having their upper ends pivotally mounted upon the ends of the shaft and their lower ends attached to cranks or levers 206 which are secured to the ends of a transverse shaft 207, said shaft 207 having secured thereon a gear 208 which meshes with a gear 209 on the shaft 173. The shaft 173 is driven by a chain 210 trained around a sprocket on said shaft and around a sprocket 211 on the shaft 52.

Above the shaft 194, a transverse beam 212 is secured upon the main supporting frame and projects laterally to one side of the same, and the glue pot or tank 213 is suspended from this beam by hangers 214. The glue-carrying belt 198 passes over a transfer roller 215 in the tank and is trained about pulleys or guide rollers 216 at the opposite ends of the beam. The guide pulley or roller 216 more remote from the glue tank has its axle or shaft 217 extended rearwardly and upon the rear end thereof is secured a friction pulley 218 which is normally in engagement with a friction pinion 219 on the shaft of a small motor 220, this motor driving the glue-conveying belt but performing no other work. The motor 220 is carried by a shelf 221 which is secured to and projects rearwardly from a beam 222 disposed above and at the rear of the beam 212 and pivotally attached at its end more remote from the motor to the adjacent standard 191 while at its shelf-carrying end it is equipped with a keeper bolt 223 playing in a slot 224 in the adjacent standard 191 so that it cannot fall away from the standard. Carried by the sliding block 193 which is below the shelf 221 is a pusher bar 225 which extends upwardly from said block and is arranged to impinge against an abutment screw 226 mounted through the beam 221 so that, when the knife is raised to engage the glue belt and take glue therefrom the motor will be shifted so that the pinion 219 will be out of engagement with the pulley 218 and the belt will remain at rest.

Carried by the standards 191 is a back stop 227 against which the sheets or leaves are caused to abut by the action of the jogger arms 181. As shown most clearly in Fig. 4, the keepers 203 and 204 are brackets or plates secured to and projecting forwardly from the standards 191 and having their front ends provided with flanges 228 which are turned inwardly and may be extended and turned forwardly. Said flanges are located in spaced relation to the standards so that the extended ends of the knives will be caused to ride within the keepers and be guided into proper engagement with the glue belt or with the stacked sheets accordingly as the knife is at the upper or lower limit of its movement.

The feed belts 154 are carried by drums or rollers 155, the bearings for the forward drum or roller being mounted upon frame members 231 rising from the frame bars 84 and said members 231 carry frames 232 in which the rollers 153 are mounted, while the shaft 233 carrying the rear rollers 155 is supported in arms 234 secured to the main supporting frame and having a rack or plurality of notches 235 in its upper edge so that by setting the shaft in selected notches the tension of the feed belts may be maintained. The shaft 236 carrying the forward rollers or drums is equipped with a pinion 237 meshing with a gear 238 secured upon a shaft 239 which is mounted upon the frame between the rollers 153 and the rollers 97 so that, when the shaft 239 is rotated, the feed belts 154 will be driven in the proper direction. A sprocket pinion 240 is secured upon the shaft 239 and a chain 241 is trained about said pinion and about a pinion 242 on the shaft 77 so that the gearing just described will be driven from the last named shaft. The gear 238 also meshes with a pinion 243 on the shaft of the lower roller 153 and with a pinion 244 on the shaft of the lower roller 97 so that said rollers will be driven simultaneously, as will be understood. There is also a pinion 245 on the same shaft with the pinion 244 and a chain 246 is trained around said pinion and around a pinion 247 on the shaft of the lower feed roller 85 so that all of the feed rollers will be driven from one point.

It is thought the operation of the apparatus will be understood from what has been said but it may be briefly summarized. The blank sheets or leaves are fed in any convenient manner onto the initial feed belts 5 which carry them to the cutters and the cutters make notches in the advancing ends of the sheets, the cutters and cooperating elements being shifted transversely between successive operations of the cutters so that the tongues and notches in successive sheets will be staggered. The cut sheets are then carried to the folder mechanism and two sheets have the free ends or tips of their tongues folded and simultaneously with the folding action are caused to advance somewhat toward the glue-applying devices. The rollers 97 flatten the folds slightly but do not crimp them to the desired extent and this operation is performed by the rollers 153 which also feed the sheets onto the belts 154. The belts 154 transfer the sheets onto the table 156 or the sheets already deposited on the table and the table gradually descends as the sheets are piled thereon, pressure to start the sheets downwardly being applied through the presser bars 170, and simultaneously with the engagement of the sheets by the presser bars 170 the glue knife is brought into contact with the edges of the sheets to apply glue to the tip ends of the folded tongues. Each successive sheet will be thereby pressed onto the sheet below it so that the tongues on alternate sheets will be joined together by the glue or other adhesive, and when a sufficient number of the sheets or leaves have been treated with the adhesive they are withdrawn from the table through the space between the standards 191 below the back stop 227 for the application of the backs and sides of the book cover. The apparatus operates very rapidly and produces a complete book ready to receive the cover very economically. No sewing of the books is necessary and while the leaves or sheets are joined only at their extreme ends they are very securely held together and the bound book will open flat and lie flat at any point.

Having thus described the invention, I claim:

1. A book-making machine comprising cutters constructed to cut notches in the end of a sheet presented thereto and mounted for vertical and endwise horizontal movement, means for feeding sheets to the cutters, and means for vertically reciprocating the cutters and shifting them laterally between successive vertical reciprocations to offset the tongues of successive sheets.

2. In a machine for making books, cutters constructed to cut notches in the end of a sheet presented thereto and mounted for vertical and endwise horizontal movement, means for feeding sheets to the cutters, means for alining the sheets as they are passed to the cutters, and means for operating the cutters whereby to vertically reciprocate the same and shift them laterally between successive vertical reciprocations to offset the notches in successive sheets.

3. In a book-making machine, cutters constructed to cut notches in the end of a sheet presented thereto, means for feeding sheets successively to the cutters, means below the cutters for supporting the sheets to be cut, stop members cooperating with said supporting means to arrest the sheets as they successively arrive below the cutters, means for alining the sheets as they pass to the cutters, means for actuating the cutters to move them through the presented ends of the sheets to form notches therein, means for withdrawing the stop members simultaneously with movement of the cutters through a sheet, and means for shifting the cutters transversely whereby the notches in alternate sheets will be in staggered relation.

4. In a book-making machine, cutters, a template disposed below the cutters and having openings therethrough, means for feeding sheets successively onto the template, stop fingers cooperating with the template to arrest the sheets with their advancing ends over the openings through the template and below the cutters, means for moving the cutters through the ends of the sheets to form notches therein, and means for shifting the template and cutters transversely whereby the notches in alternate sheets will be in staggered relation.

5. In a book-making machine, cutters, a template disposed below the cutters and having openings therethrough alined vertically with the cutters, means for feeding sheets onto the template, stop fingers movable through the openings in the template to arrest the sheets with their advancing ends over said openings, means for moving the cutters through the ends of the sheets to form notches therein, means for shifting the template and cutters transversely whereby the notches in alternate sheets will be in staggered relation, and means for withdrawing the stop fingers through the openings in the template as the cutters move through the sheets.

6. In a book-making machine, a head block, cutters carried by the head block, a presser plate yieldably suspended from the head block and having openings therethrough alined with the cutters, a template below the presser plate and having openings therethrough alined with the cutters and the openings in the presser plate, means for feeding sheets onto the template, stop fingers fitted through the openings in the template and adapted to enter the openings in the presser plate, and means for reciprocating the head block and the stop fingers whereby the sheet upon the template will be clamped, the cutters moved through the end of the sheet, and the stop fingers withdrawn as the cutters descend.

7. In a book-making machine, a feed belt for delivering sheets, cutters arranged to form notches in the ends of sheets delivered by the feed belt, a presser roller arranged above the belt, means for vertically reciprocating the cutters, and means for causing said presser roller to bear upon a sheet and cause the same to frictionally engage the feed belt as the cutters leave the sheet.

8. In a book-making machine, a feed table having a rail along one side edge, means for feeding sheets over the table, cutters acting upon sheets fed over the table, a jogger arm pivotally supported above the feed table at the side thereof opposite the guide rail, a resilient plate secured to the pivot of the jogger arm and projecting upwardly and laterally therefrom, means moving with the cutters to vibrate the resilient plate and the jogger arm whereby to shift the sheets laterally to the guide rail for alining successive sheets, and yieldable means for holding the jogger arm normally away from the sheets.

9. In a book-making machine, the combination of a feed table, means for conveying sheets over the feed table, a head block, cutters carried by the head block, means for vertically reciprocating the head block whereby the cutters will be moved through the advancing ends of sheets delivered thereto, a jogger arm pivotally supported above the feed table, and a striker carried by the head block and arranged to vibrate the jogger arm into engagement with the sheets whereby the sheets will be alined as they pass to the cutters.

10. In a book-making machine, cutters, a template disposed below the cutters and having openings therethrough alined vertically with the cutters, means for feeding sheets onto the template, stop fingers movable through the openings in the template to arrest the sheets with their advancing ends over said openings, means for moving the cutters through the ends of the sheets to form notches therein, and means for withdrawing the stop fingers through the openings in the template as the cutters move through the sheets.

11. The combination of a head block, spaced cutters thereon, a template below the head block having openings therein to receive the cutters, means for feeding sheets between the template and the cutters, the template and the head block being mounted for movement together transversely of the feeding means and the head block being mounted for vertical movement toward and from the template, means for reciprocating the head block and the template endwise, and means for moving the head block vertically toward and from the template.

12. The combination of a head block, spaced cutters secured on the under side of the head block, a template below the head block having openings therein to receive the cutters, posts secured in the template and fitted slidably through the head block, rails between which the template is fitted for endwise sliding movement, means for feeding sheets over the rails and the template, means for moving the head block toward and from the template, and means for reciprocating the head block endwise.

13. The combination of a head block, spaced cutters secured on the under side of the head block, a template below the head block having openings therein to receive the cutters, posts fixed to and rising from the template and slidably engaged through the head block, a presser plate yieldably suspended on the head block below the cutters and having openings therethrough alined vertically with the cutters, pins connecting the presser plate and the template and permitting relative movement of the presser plate, buffers between the presser plate and the template, means for feeding sheets between the presser plate and the template, means for moving the head block toward and from the template, and means for reciprocating the head block endwise transversely of the feeding means.

In testimony whereof I affix my signature.

CHARLES C. HOWARD. [L. S.]